Patented June 15, 1943

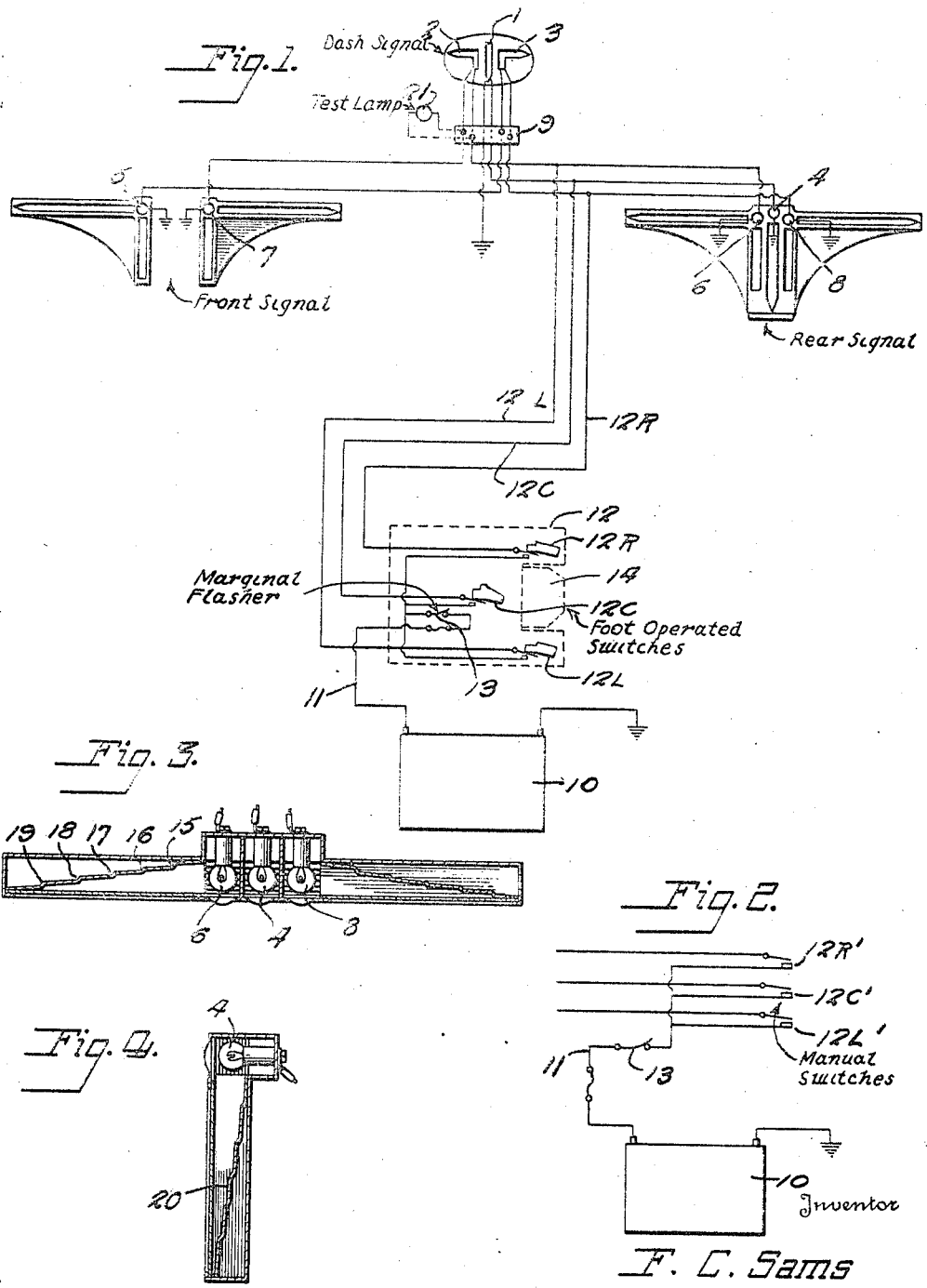

2,322,158

UNITED STATES PATENT OFFICE 2,322,158

DIRECTIONAL SIGNAL INDICATOR

Francis Claire Sams, Bath, N. Y.

Application July 11, 1939, Serial No. 283,887

2 Claims. (Cl. 177—311)

This invention pertains to an indicator system for electric directional signals for motor vehicles and the like and particularly pertains to means to indicate the operative condition of multiple sets of indicator lights.

Multiple sets of indicator signals may be positioned with one group at the rear of a motor vehicle and another at the front of the vehicle. In each group individual lights may point a direction in which the vehicle is about to turn, or else may convey merely a caution signal. Such indicators frequently comprise a lighted arrow pointing to the right and one pointing to the left as required. The present invention pertains to a signal light system in which, at the rear of a vehicle, is an arrow pointing to the left and an arrow pointing to the right with a caution arrow therebetween. At the front of the vehicle is a directional signal comprising an arrow pointing to the right and an arrow pointing to the left. It is desirable to indicate when any of the individual signal lights becomes inoperative.

An object of this invention is to provide a vehicle signal system comprising multiple sets of lights with means to indicate the failure of any of the lights. Another object is to provide a telltale to indicate selectively the operative condition of front lights in a signal system of a vehicle or of rear lights or of a caution light in the system. A particular object of this invention is to utilize a flashing indicator that is actuated by differences in resistance between the front and the rear signal lights. A special object is in an electrical directional signal system for motor vehicles to arrange a selective indicator to be actuated by differences in candle power between the front lights of the system and the rear lights. Also, it is a purpose of this invention to indicate failure in the indicator itself, and a further purpose to provide means for testing the indicator system at will. A particular object is to utilize a flashing signal to indicate the operative condition of one set of lights in the vehicle directional signal system, with continuous lighting of the signal to indicate burn-out of one of that set of lights; and with yet a third means of indication, such as failure of the indicator to light at all, when the second set of directional lights is burned out. These objects and other objects and advantages of this invention will be apparent in the following illustrative description of a preferred embodiment of this invention. This description is taken with reference to the accompanying drawing, with the novel features of the invention more fully pointed out in the appended claims.

In the drawing:

Figure 1 presents a diagrammatic arrangement of an electric signal indicator system according to this invention;

Figure 2 presents diagrammatically a portion of that system of Figure 1 comprising a source of power and an arrangement of switches intended for manual operation;

Figure 3 shows in horizontal cross section a preferred arrangement of lights and reflector plates to illuminate right and left directional arrows of this system;

Figure 4 presents a vertical section through Figure 3 showing particularly a caution light as arranged in the directional signal group at the rear preferably of a vehicle.

Many advantages and objects of this invention are accomplished by providing a group of dash lights arranged in electric connection with both a front group of directional signals and a rear group of directional signals for a motor vehicle, with a power line comprising a flasher connected in series with the two groups of directional signal lights. Preferably, the flasher is arranged to actuate the tell-tale dash lights according to differences in candle power between the front group of indicator signal lights and the rear group of indicator signal lights.

Reference is made more particularly to the specific embodiment of this invention shown in the drawing, though not to be restrictive but only illustrative. In Figure 1 is shown a source of power such as a battery having parallel circuits, the one comprising rear directional lights, the other comprising front directional lights. The front lights 5 and 7 are shown in Figure 1 as viewed from the front while the rear lights 4 and 6 and a group of indicator lights 2 and 3 are shown as viewed from the rear. This system comprises a dash light set of three bulbs respectively positioned with suitable designating means such as arrows. The tell-tale set shown comprises a downwardly pointing arrow centrally arranged and designated by the numeral 1, a directional arrow 2 pointing to the left of the dash and a directional arrow 3 pointing to the right. This designation corresponds to the signal light bulbs. The electrical connections are such that central light 1 at the dash is grounded on one side with the other side connected with a caution light 4 at the rear of the vehicle. This light 4 also is grounded. Dash light 2 with arrow pointing to the left is connected at one side in series with a directional light 7 at the front of the vehicle. This front light 7 also is grounded. This light 7 shows an arrow at the front of the car pointing to the left. Dash light 2 is also connected in parallel with a rear signal light 6 which points to the left. This light 6 also is grounded.

The dash light 3 with arrow pointing to the right is connected in series to the front signal light 5 which points to the right. This light 5 is grounded. Dash light 3 also is connected in parallel with a rear signal light 8 that points to the right. This light 8 also is grounded.

The wiring from the dash light 2 and the wiring from the dash light 3 passes through a device that may be termed a trouble shooter 9. This comprises means for exposing a portion of the two wires leading to left dash light 2 and means for exposing a portion of the two wires leading to the right dash light 3. Thus means may be connected across one of these exposed portions to determine which of left dash and left front lights 2 and 5 has ceased functioning, if either; and similarly with respect to the right dash and right front lights 3 and 5.

A source of power, such as battery 10, is grounded at one side and at the other side is connected through line 11 in parallel connection with a group of switches 12 which serves to distribute power to the front and rear signal lights and the tell-tale dash lights. In line 11 is positioned a flasher 13 in series with the group of switches 12. The line 11 in one branch of this parallel connection divides through a switch 12R to conect with the line between rear light signal 8 and right dash tell-tale light 3. Thus the flasher 13 and switch 12R are placed in series with right rear signal light 8. The flasher 13 is designed to require at least a certain minimum current to operate, for example, at least a fifteen candle power lamp. Such are the lamps 6 and 8 placed as rear signal lamps. The line 11 divides not only through switch 12R but divides also through a branch containing switch 12L to connect with the line between left rear signal light 6 and left dash tell-tale light 2. Thus the flasher 13 is placed in series with the left rear signal light 6 and the left tell-tale dash light. Further, the line 11 and flasher 13 connects through a branch containing a switch 12C with the line between rear caution light 4 and tell-tale dash light 1. Thus any one of the rear lights, that is caution rear light 4 or left rear signal light 6 or right rear signal light 8 may be actuated through the respective individual switches 12C, 12L or 12R. As each is actuated and draws current through the flasher 13, each light flashes at the rear and at the corresponding tell-tale dash light.

It will be observed that when either one of the switches 12L or 12R is closed power from battery 10 may flow also through the respective tell-tale lights 2 or 3 to the respective left or right front lights 7 or 5. However, since the flasher 13 is designed not to operate as a flasher but simply to permit passage of current when less than the minimum, for example, lower than corresponds to 15 candle power, the dash tell-tale lights do not flash when either front signal light is actuated.

It is evident in the illustration shown in Figure 1 that each of the rear signal lights is designed to operate at the voltage of the battery 10, for example, at six volts. This is so inasmuch as each rear light is in a separate series circuit with the battery 10. On the other hand, it is evident that the dash lights and front lights are in series with each other in the battery circuit so that taken together a dash light and the corresponding front light operate at the battery voltage, for example, left indicator light 2 and left front light 7 together would operate at six volts so that each, for example, may be a three volt light. Similarly, each dash light 3 and front light 7 taken alone will be less than six volts.

In Figure 2, battery 10 and line 11 with flasher 13 are in series with a group of switches 12L', 12R' and 12C' that are operated manually in analogous manner to the connections heretofore described with respect to foot controlled switches 12L and 12R and 12C.

It is advantageous to utilize the flashing actuation of rear lights 4, 6 and 8 in cooperation with a series of reflecting facets along an elongate line of lighting of the respective signals, as shown in Figures 3 and 4. For example, in Figure 3, left rear signal is backed by an extensive surface that comprises a series of reflecting faces arranged step-wise at an acute angle to the bulb 6.

Similarly, a gradated series of reflecting faces is positioned opposite the right bulb 8. For example, this signal light backing comprises a series of reflecting facets 15, 16, 17, 18 and 19 positioned individually at a suitable angle, such as 45°, to the rear left light 6. It is evident that the faces between these 45° facets may also reflect light, if desired. In either case it is evident that light beams are projected to the rear from the reflector. These faces are spaced from the light 6 at an angle so that distances diminish gradually between the first reflecting surface 15 and the front of the light to a minimum distance between the farthest reflecting surface 19 and the front of the signal.

Figure 4 illustrates an application of this steplike series of reflecting faces in a vertical direction downwardly from the central caution light 4 such as is used at the rear of the vehicle. This series of reflecting faces is designated generally by the numeral 20 in Figure 4.

In use of the indicator system, it is apparent that when any one of the signal lights is actuated at the front or at the rear of the vehicle, a corresponding indicator will be actuated at the dash. Thus when switch switch 12L is closed, both front left signal 7 and rear left signal 6 should light, while corresponding left indicator 2 lights on the dash. Inasmuch as current to light the fifteen candle power rear signal is drawn through flasher 13, both front and rear signals and the indicator will present a flashing light. However, should rear left signal 6 be burned out, the requisite current will not flow through the flasher 13 to cause any flashing in either the indicator or the front left signal. Nevertheless current will flow sufficient to light the left indicator 2 on the dash and left front signal 7. The dash light then will present a continuous glow rather than a flash. That is to say, when the left rear signal is not functioning, the dash light indicating the left signal will burn steadily rather than with flashing. Lack of flashing in the indicator light then indicates that the rear left signal is not functioning.

On the other hand, should the left rear signal be functioning but the front left signal be burned out, the left indicator light will not light at all. It is evident from the drawing, however, that absence of light at the dash might be caused by fault either of the dash light 2 or of the front left light 7. To determine which of these is the case, resort may be had to the so-called trouble shooter 9 in which are exposed contacts from the two leads to the left dash light 2. A suitable instrument may be thrown into circuit across these two exposed contacts. Such an instrument may be merely a test light with two contacts and be of a temporary nature or it may consist of a permanent arrangement with a switch or with a permanent light 21. If the contacts across the line of light 2 should cause the trouble shooter light to burn, then it is evident that current is flowing and therefore is flowing through the corresponding front signal light which is in series therewith. That is to say, when the trouble shooter light 21 across the dash terminals 2 is actuated, it is evident that the difficulty is in the dash light 2 itself. On the other hand, should this trouble detector not function, it is evident that current is not flowing through the corresponding front signal 5 and that the difficulty is in that front signal light. That is to say, when the left dash light 2 fails to function, the trouble shooter readily indicates whether the difficulty is in the dash light itself or is in the left front signal.

Correspondingly, when the right rear indicator is functioning, the dash lamp 3 corresponding thereto flashes. When the rear right signal is not functioning, the right dash indicator 3 simply burns continuously. When the right front indicator and signal both function the right dash indicator 3 burns continuously. If the right dash indicator does not burn continuously when the front signal circuit is closed, the trouble shooter readily determines whether the difficulty is in the indicator on the dash or is in the right front signal. For when the trouble shooter is actuated current is flowing through the right front signal 5 and therefore the difficulty lies in the right dash indicator 3 itself. But if the trouble shooter light does not function, then the difficulty is in the right front signal 5.

It is evident that the caution light 4 at the rear causes the dash indicator 1 to flash when the caution is operative, but to burn clear when the rear caution light fails to function.

It is apparent that with this arrangement, the tell-tale means on the dash is operative selectively with respect to front or rear lights as a result of a flasher responsive to differences in candle power, or differences in resistance, between the front and the rear groups of lights. In other words, the tell-tale operates selectively due to a difference in current flow beneath the front and the rear groups of lights.

It is evident also that in lieu of light signals or indicators, other means may likewise exhibit many of the advantages of the system provided by this invention.

Those skilled in the art will now be able to provide deviations in detail from this preferred embodiment, within the scope of the appended claims.

What I claim is:

1. A signal system for a vehicle comprising two directional signal lights in parallel connection with a source of power and an indicator in parallel connection with one of the signal lights and in series connection with the other of the signal lights, and a flasher in the common power circuit, the amperage through the series light being inadequate to actuate the flasher and the amperage through the other light being adequate to actuate the flasher, whereby the common indicator flashes with operation of the one signal light, ceases to flash on the failure of said one signal light and ceases to operate on failure of the other signal light.

2. A signal system comprising in combination with a vehicle a source of power, a group of switches having a common connection to said source of power, groups of signal lights, each group containing a left directional signal light and a right directional signal light, said left directional signal lights being connected in parallel with one of said switches and said right directional signal lights being connected in parallel with the other of said switches for selectively connecting said left signal lights and said right signal lights to said source of power, an indicator containing a light connected in series with the left directional signal of the first group and in parallel with the left directional signal of the second group and a light connected in series with the right directional signal of the first group and in parallel with the right directional signal of the second group, and means to indicate the condition of each signal light comprising bulbs of greater current consumption in one group of signal lights than in the other of said groups, and a flasher interposed in the common connection between the power supply and the switches responsive only to the signal lights of greater current consumption.

FRANCIS CLAIRE SAMS.